(12) United States Patent
Mamaril et al.

(10) Patent No.: US 11,237,699 B2
(45) Date of Patent: Feb. 1, 2022

(54) PROXIMAL MENU GENERATION

(71) Applicant: Microsoft Technology Licensing, LLC, Redmond, WA (US)

(72) Inventors: Bryan K. Mamaril, Seattle, WA (US); Matthias Baer, Seattle, WA (US); Gregory A. Howard, Kirkland, WA (US); Jonathan M. Cain, Seattle, WA (US); Isaiah Ng, Bellevue, WA (US); Jack B. Gerrits, Redmond, WA (US); Kiran Kumar, Redmond, WA (US); Jessica Bourgade, Redmond, WA (US); Michael C. Hilsdale, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 15/680,713

(22) Filed: Aug. 18, 2017

(65) Prior Publication Data

US 2019/0056840 A1    Feb. 21, 2019

(51) Int. Cl.
*G06F 3/0482* (2013.01)
*G06F 3/0488* (2013.01)
*G06F 9/451* (2018.01)
*G06F 3/0483* (2013.01)
*G06F 3/0481* (2013.01)

(52) U.S. Cl.
CPC .......... *G06F 3/0482* (2013.01); *G06F 3/0483* (2013.01); *G06F 3/0488* (2013.01); *G06F 3/04817* (2013.01); *G06F 3/04883* (2013.01); *G06F 3/04886* (2013.01); *G06F 9/451* (2018.02)

(58) Field of Classification Search
CPC .. G06F 3/0482; G06F 3/0488; G06F 3/04817; G06F 3/0483; G06F 3/04886; G06F 3/04883; G06F 9/451
See application file for complete search history.

(56) References Cited

U.S. PATENT DOCUMENTS

| 5,263,134 | A | 11/1993 | Paal et al. |
| 5,455,906 | A | 10/1995 | Usuda |
| 5,920,316 | A * | 7/1999 | Oran .................. G06F 3/0482 715/779 |
| 7,802,195 | B2 | 9/2010 | Saul et al. |
| 8,054,241 | B2 | 11/2011 | Muklashy et al. |

(Continued)

OTHER PUBLICATIONS

"Final Office Action Issued in U.S. Appl. No. 15/680,849", dated May 23, 2019, 25 Pages.

(Continued)

*Primary Examiner* — Nicholas Klicos
(74) *Attorney, Agent, or Firm* — International IP Law Group, PLLC

(57) ABSTRACT

A system for generating proximal menus described herein can include a processor to detect a location of a touch gesture on a display device coupled to the system. The processor can also determine a proximal menu is to be displayed at the location of the touch gesture and populate the proximal menu with at least one feature corresponding to a ring of an operating system. Furthermore, the processor can display the proximal menu with the at least one feature within an executed application.

20 Claims, 5 Drawing Sheets

(56) References Cited

U.S. PATENT DOCUMENTS

| | | | |
|---|---|---|---|
| 8,869,065 B2* | 10/2014 | Mandic | G06F 3/0482 715/813 |
| 8,976,140 B2 | 3/2015 | Hirata | |
| 9,471,150 B1 | 10/2016 | Addaguduru | |
| 9,606,723 B2 | 3/2017 | Selim | |
| 9,727,205 B2 | 8/2017 | Freedman | |
| 9,798,448 B2 | 10/2017 | Duffy | |
| 9,946,373 B2 | 4/2018 | Graf et al. | |
| 10,073,613 B2 | 9/2018 | Liao et al. | |
| 2003/0222923 A1* | 12/2003 | Li | G06F 3/0482 715/815 |
| 2004/0150668 A1* | 8/2004 | Myers | G06F 3/0421 715/771 |
| 2006/0132474 A1 | 6/2006 | Lam | |
| 2006/0200780 A1* | 9/2006 | Iwema | G06F 3/0482 715/810 |
| 2006/0218499 A1* | 9/2006 | Matthews | G06F 16/313 715/765 |
| 2007/0168873 A1* | 7/2007 | Lentz | G06F 3/04812 715/763 |
| 2008/0036743 A1 | 2/2008 | Westerman et al. | |
| 2008/0068290 A1 | 3/2008 | Muklashy et al. | |
| 2008/0115064 A1 | 5/2008 | Roach et al. | |
| 2009/0058842 A1 | 3/2009 | Bull et al. | |
| 2009/0070670 A1 | 3/2009 | Kishi | |
| 2009/0083655 A1 | 3/2009 | Beharie et al. | |
| 2009/0199128 A1 | 8/2009 | Matthews et al. | |
| 2009/0228831 A1* | 9/2009 | Wendker | G06F 3/0482 715/808 |
| 2009/0235177 A1 | 9/2009 | Saul et al. | |
| 2009/0259967 A1 | 10/2009 | Davidson et al. | |
| 2009/0300541 A1 | 12/2009 | Nelson | |
| 2009/0313125 A1* | 12/2009 | Roh | G06Q 30/0224 705/14.66 |
| 2009/0327964 A1* | 12/2009 | Mouilleseaux | G06F 3/0482 715/834 |
| 2010/0017744 A1 | 1/2010 | Kikuchi et al. | |
| 2010/0083111 A1* | 4/2010 | de los Reyes | G06F 3/0482 715/702 |
| 2010/0083154 A1 | 4/2010 | Takeshita | |
| 2010/0125806 A1 | 5/2010 | Igeta | |
| 2010/0192102 A1* | 7/2010 | Chmielewski | G06F 3/04817 715/834 |
| 2010/0214322 A1 | 8/2010 | Lim et al. | |
| 2010/0306702 A1* | 12/2010 | Warner | G06F 3/0482 715/811 |
| 2011/0047459 A1 | 2/2011 | Van Der Westhuizen | |
| 2011/0066980 A1* | 3/2011 | Chmielewski | G06F 3/0482 715/834 |
| 2011/0148926 A1* | 6/2011 | Koo | G06F 3/017 345/635 |
| 2011/0169749 A1 | 7/2011 | Ganey et al. | |
| 2011/0193939 A1* | 8/2011 | Vassigh | G06F 3/011 348/46 |
| 2011/0202879 A1* | 8/2011 | Stovicek | G06F 3/0482 715/828 |
| 2011/0209102 A1 | 8/2011 | Hinckley et al. | |
| 2011/0239157 A1 | 9/2011 | Lin et al. | |
| 2011/0260997 A1 | 10/2011 | Ozaki | |
| 2011/0316807 A1 | 12/2011 | Corrion | |
| 2012/0001945 A1 | 1/2012 | Oakley | |
| 2012/0044164 A1 | 2/2012 | Kim et al. | |
| 2012/0050314 A1 | 3/2012 | Wang | |
| 2012/0050332 A1 | 3/2012 | Nikara et al. | |
| 2012/0054671 A1* | 3/2012 | Thompson | G06F 3/038 715/784 |
| 2012/0072867 A1 | 3/2012 | Schlegel | |
| 2012/0139815 A1 | 6/2012 | Aono et al. | |
| 2012/0223898 A1 | 9/2012 | Watanabe et al. | |
| 2012/0289290 A1 | 11/2012 | Chae et al. | |
| 2012/0306930 A1 | 12/2012 | Decker et al. | |
| 2012/0320158 A1 | 12/2012 | Junuzovic et al. | |
| 2012/0327121 A1* | 12/2012 | Dhawade | G06F 3/04883 345/649 |
| 2013/0009903 A1 | 1/2013 | Shiota | |
| 2013/0019173 A1* | 1/2013 | Kotler | G06F 3/04883 715/711 |
| 2013/0019182 A1* | 1/2013 | Gil | G06F 3/0482 715/738 |
| 2013/0019206 A1* | 1/2013 | Kotler | G06F 3/04812 715/834 |
| 2013/0038544 A1 | 2/2013 | Park | |
| 2013/0103446 A1 | 4/2013 | Bragdon et al. | |
| 2013/0162569 A1 | 6/2013 | Sudo | |
| 2013/0176255 A1 | 7/2013 | Kim et al. | |
| 2013/0219340 A1* | 8/2013 | Linge | G06F 3/04883 715/834 |
| 2013/0237288 A1 | 9/2013 | Lee | |
| 2013/0257777 A1* | 10/2013 | Benko | G06F 3/0346 345/173 |
| 2013/0285933 A1 | 10/2013 | Sim et al. | |
| 2013/0311954 A1* | 11/2013 | Minkkinen | G06F 3/04812 715/862 |
| 2013/0321319 A1 | 12/2013 | Kuramatsu | |
| 2013/0321340 A1 | 12/2013 | Seo et al. | |
| 2014/0033119 A1 | 1/2014 | Kim et al. | |
| 2014/0055390 A1 | 2/2014 | Lim et al. | |
| 2014/0092140 A1 | 4/2014 | Wadhwa et al. | |
| 2014/0160073 A1 | 6/2014 | Matsuki | |
| 2014/0164991 A1 | 6/2014 | Kim et al. | |
| 2014/0168277 A1 | 6/2014 | Ashley et al. | |
| 2014/0181739 A1 | 6/2014 | Yoo | |
| 2014/0189583 A1 | 7/2014 | Yang | |
| 2014/0218315 A1 | 8/2014 | Jeong | |
| 2014/0267078 A1* | 9/2014 | Kukulski | G06F 3/0416 345/173 |
| 2014/0289642 A1 | 9/2014 | Prasad | |
| 2014/0325431 A1 | 10/2014 | Vranjes et al. | |
| 2014/0327626 A1* | 11/2014 | Harrison | G06F 3/04883 345/173 |
| 2014/0351761 A1 | 11/2014 | Bae et al. | |
| 2014/0365957 A1 | 12/2014 | Louch et al. | |
| 2014/0372926 A1 | 12/2014 | Szeto | |
| 2015/0046871 A1 | 2/2015 | Lewis | |
| 2015/0058808 A1* | 2/2015 | John | G06F 3/0488 715/835 |
| 2015/0067552 A1 | 3/2015 | Leorin et al. | |
| 2015/0067589 A1 | 3/2015 | Xiao et al. | |
| 2015/0084885 A1 | 3/2015 | Kawamoto | |
| 2015/0186016 A1 | 7/2015 | Li | |
| 2015/0193099 A1* | 7/2015 | Murphy | G06F 3/0483 715/777 |
| 2015/0205455 A1* | 7/2015 | Shaw | G06F 3/04842 715/834 |
| 2015/0212667 A1* | 7/2015 | Holt | G06F 3/04842 345/173 |
| 2015/0256592 A1 | 9/2015 | Young et al. | |
| 2015/0279037 A1 | 10/2015 | Griffin et al. | |
| 2015/0319202 A1 | 11/2015 | Chai et al. | |
| 2015/0331594 A1 | 11/2015 | Terada et al. | |
| 2015/0338998 A1 | 11/2015 | Chathoth et al. | |
| 2015/0378502 A1 | 12/2015 | Hu et al. | |
| 2016/0034157 A1 | 2/2016 | Vranjes et al. | |
| 2016/0054881 A1 | 2/2016 | Yoshida et al. | |
| 2016/0077650 A1 | 3/2016 | Durojaiye et al. | |
| 2016/0077685 A1 | 3/2016 | Fang et al. | |
| 2016/0110076 A1 | 4/2016 | Reeves et al. | |
| 2016/0155410 A1 | 6/2016 | Nam | |
| 2016/0162150 A1 | 6/2016 | Patel et al. | |
| 2016/0162240 A1 | 6/2016 | Gu et al. | |
| 2016/0170617 A1 | 6/2016 | Shi et al. | |
| 2016/0179289 A1 | 6/2016 | Takamura et al. | |
| 2016/0270656 A1 | 9/2016 | Samec et al. | |
| 2016/0307344 A1 | 10/2016 | Monnier et al. | |
| 2016/0334975 A1 | 11/2016 | Takeuchi et al. | |
| 2017/0039414 A1* | 2/2017 | Sreenivas | G06K 9/0004 |
| 2017/0060319 A1 | 3/2017 | Seo et al. | |
| 2017/0097141 A1 | 4/2017 | Hyodo et al. | |
| 2017/0097746 A1 | 4/2017 | Doray et al. | |
| 2017/0180678 A1 | 6/2017 | Fish et al. | |

(56) References Cited

U.S. PATENT DOCUMENTS

| | | | |
|---|---|---|---|
| 2017/0185037 A1 | 6/2017 | Lee et al. | |
| 2017/0255320 A1 | 9/2017 | Kumar et al. | |
| 2017/0269771 A1* | 9/2017 | Nam | G06F 3/0416 |
| 2017/0300205 A1* | 10/2017 | Villa | G06F 3/04817 |
| 2017/0329413 A1 | 11/2017 | Kramer et al. | |
| 2018/0196480 A1 | 7/2018 | Murphy | |
| 2018/0203596 A1 | 7/2018 | Dhaliwal et al. | |
| 2018/0203660 A1 | 7/2018 | Hwang et al. | |
| 2018/0329580 A1 | 11/2018 | Aurongzeb et al. | |
| 2019/0129596 A1 | 5/2019 | Ligameri et al. | |
| 2019/0339854 A1 | 11/2019 | Wei | |

OTHER PUBLICATIONS

"International Search Report and Written opinion Issued in PCT Application No. PCT/US18/038380", dated Sep. 28, 2018, 12 Pages.

"International Search Report and Written opinion Issued in PCT Application No. PCT/US18/038383", dated Sep. 28, 2018, 12 Pages.

"International Search Report and Written opinion Issued in PCT Application No. PCT/US18/038393", dated Oct. 10, 2018, 17 Pages.

"International Search Report and Written opinion Issued in PCT Application No. PCT/US18/038394", dated Sep. 25, 2018, 11 Pages.

"Applicant Initiated Interview Summary Issued in U.S. Appl. No. 15/680,849", dated Jul. 12, 2019, 05 Pages.

"Non Final Office Action Issued in U.S. Appl. No. 15/680,849", dated Jan. 10, 2019, 27 Pages.

"Non Final Office Action Issued in U.S. Appl. No. 15/680,884", dated Dec. 10, 2018, 18 Pages.

"Non Final Office Action Issued in U.S. Appl. No. 15/680,908", dated Mar. 6, 2020, 25 Pages.

"Non Final Office Action Issued in U.S. Appl. No. 15/680,849", dated Jul. 9, 2020, 33 Pages.

"Final Office Action Issued in U.S. Appl. No. 15/680,908", dated Jul. 13, 2020, 30 Pages.

"Final Office Action Issued in U.S. Appl. No. 15/680,849", dated Oct. 23, 2020, 35 Pages.

"Office Action Issued in European Patent Application No. 18740029.6", dated Dec. 18, 2020, 11 Pages.

"Non-Final Office Action Issued in U.S. Appl. No. 15/680,908", dated Nov. 9, 2020, 32 Pages.

"Final Office Action Issued in U.S. Appl. No. 15/680,908", dated Apr. 1, 2021, 30 Pages.

"Summons to Attend Oral Proceedings Issued in European Patent Application No. 18740029.6", dated Jun. 15, 2021, 16 Pages.

* cited by examiner

300A

300B

300C

300D

300E

300F

PROXIMAL MENU GENERATION

BACKGROUND

Computer devices can be coupled to any suitable number of display devices. In some examples, a single large display device or multiple interconnected display devices can depict a user interface of the computer device over a large area. Accordingly, application windows and operating system features or task bars can be separated by large distances. Depending on the size of the user interface displayed with one or more display devices, selecting features of various applications and features of an operating system from a user interface can force a user to change physical locations.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for generating proximal menus that includes a processor and a memory device to store a plurality of instructions that, in response to an execution of the plurality of instructions by the processor, cause the processor to detect a location of a touch gesture on a display device coupled to the system. The plurality of instructions can also cause the processor to determine a proximal menu is to be displayed at the location of the touch gesture and populate the proximal menu with at least one feature corresponding to a ring of an operating system. Furthermore, the plurality of instructions can cause the processor to display the proximal menu with the at least one feature within an executed application.

Another embodiment described herein includes a method for generating proximal menus that includes detecting a location of a touch gesture on a display device coupled to the system and determining a proximal menu is to be displayed at the location of the touch gesture. The method also includes populating the proximal menu with at least one feature corresponding to a ring of an operating system and displaying the proximal menu with the at least one feature within an executed application.

Another embodiment described herein includes one or more computer-readable storage media for generating proximal menus, wherein the one or more computer-readable storage media comprise a plurality of instructions that, in response to execution by a processor, cause the processor to detect a location of a touch gesture on a display device coupled to the system. The plurality of instructions can also cause the processor to determine a proximal menu is to be displayed at the location of the touch gesture and populate the proximal menu with at least one feature corresponding to a ring of an operating system. Furthermore, the plurality of instructions can cause the processor to display the proximal menu with the at least one feature within an executed application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
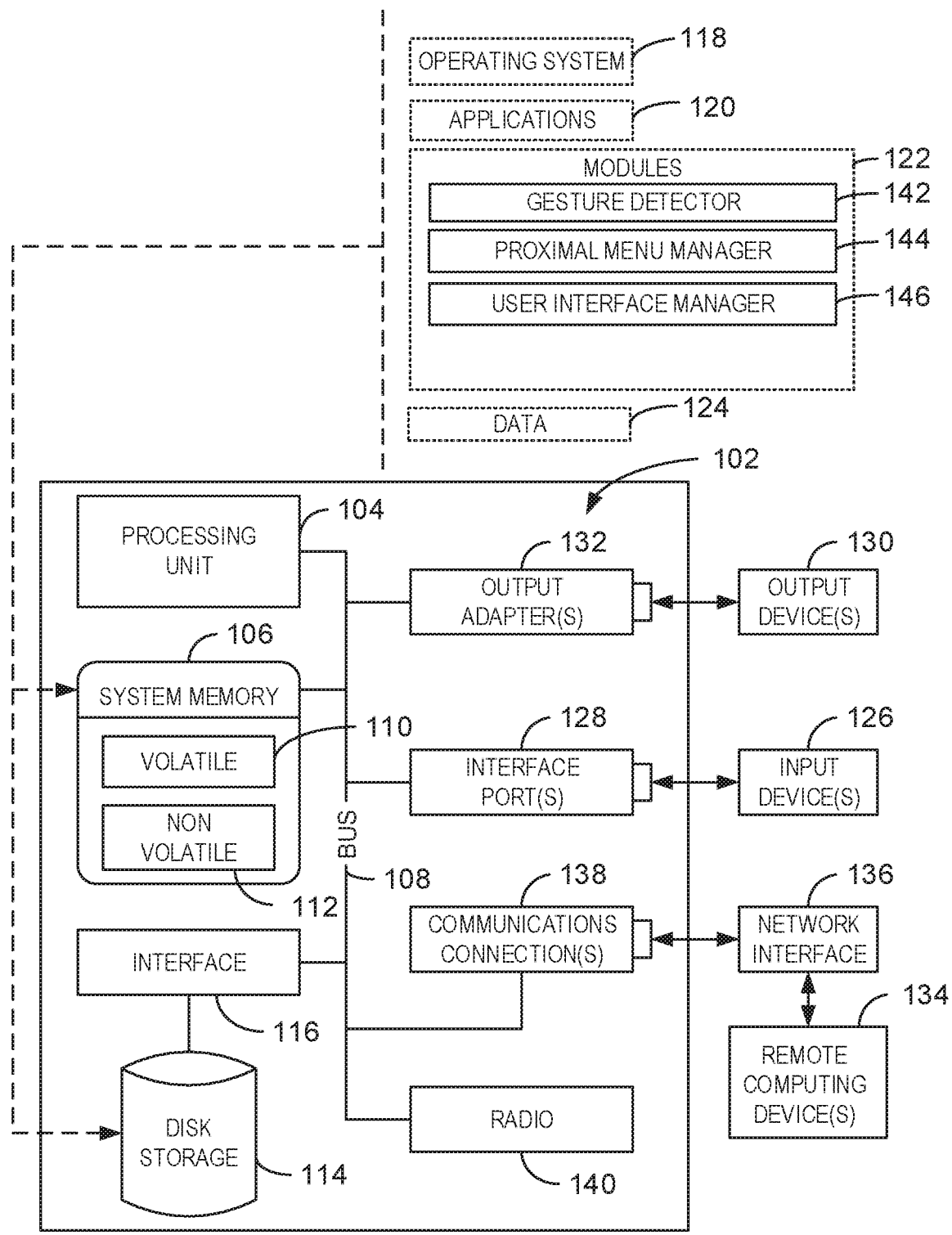
FIG. 1 is a block diagram of an example of a computing system that can generate proximal menus.

User interfaces can be generated using various techniques and can include graphical user interfaces (GUIs) for any number of applications. For example, a user interface can include a GUI for any suitable number of applications being executed, operating system features, and the like. In some embodiments, a display device or multiple interconnected display devices can display large user interfaces that may include application features and operating system features spread over large distances. In some embodiments, multiple users can also interact with one or more applications included in the user interface.

Techniques described herein provide a system for generating proximal menus to be included in a user interface. A proximal menu, as referred to herein, can include any suitable number of application features, operating system features, or any combination thereof. For example, the proximal menu can provide editing features for applications, application window features to resize or close an application graphical user interface, and operating system features, such as accessing an interface for switching between active applications, digital assistant icons, and search features, among others. In some embodiments, the system can detect a location of a touch gesture on a display device coupled to the system. The system can also determine a proximal menu is to be displayed at the location of the touch gesture. Additionally, the system can populate the proximal menu with at least one feature corresponding to a ring of an operating system. Traditional menus and interfaces separate features into those specific to the executed application, those concerning the window in which the application appears, and those that are globally-relevant to the operating system (rather than pertaining specifically to the executed application). In some embodiments, the type or layout of the display device(s) can make it physically cumbersome for the user to access features from each of these distinct "rings" of functionality without significant changes to hand or body position. The techniques herein can assist a user by granting access to multiple such rings of functionality from a single proximal menu, which can be accessible without changes to posture or location. A ring of an operating system, as referred to herein, can indicate an application feature or an operating system feature to be included in the proximal menu. For example, a first ring of an operating system can correspond to operating system features, a second ring of an operating system can correspond to application window features, and a third ring of the operating system can correspond to executed application features, among others. Furthermore, the system can display the proximal menu with the at least one feature within an executed application.

The techniques described herein enable generating proximal menus that enable a user to select application features or operating system features on large display devices without the user moving to a new physical location. The techniques also enable displaying any number of proximal menus for interaction with multiple users via a single display device or multiple interconnected display devices.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate proximal menus. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

In some embodiments, a unified extensible firmware interface (UEFI) manager or a basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a gesture detector 142, a proximal menu manager 144, and a user interface manager 146. In some embodiments, the gesture detector 142 can detect a location of a touch gesture on a display device coupled to the system. For example, the gesture detector 142 can detect any suitable number of fingers or hands contacting a display device within a predetermined region size and within a predetermined time interval. In some embodiments, the proximal menu manager 144 can determine a proximal menu is to be displayed at the location of the touch gesture. For example, the proximal menu manager 144 can generate a proximal menu in response to any suitable predetermined touch gesture. Additionally, the proximal menu manager 144 can populate the proximal menu with at least one feature corresponding to a ring of an operating system. As discussed above, the ring of an operating system can indicate whether application features, application window features, operating system features, or a combination thereof, are to be included in the proximal menu. Furthermore, the user interface manager 146 can display the proximal menu with the at least one feature within an executed application. In some embodiments, the user interface manger 146 can display the proximal menu in a region adjacent to a contact point of the touch gesture.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the gesture detector 142, proximal menu manager 144, and user interface manager 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
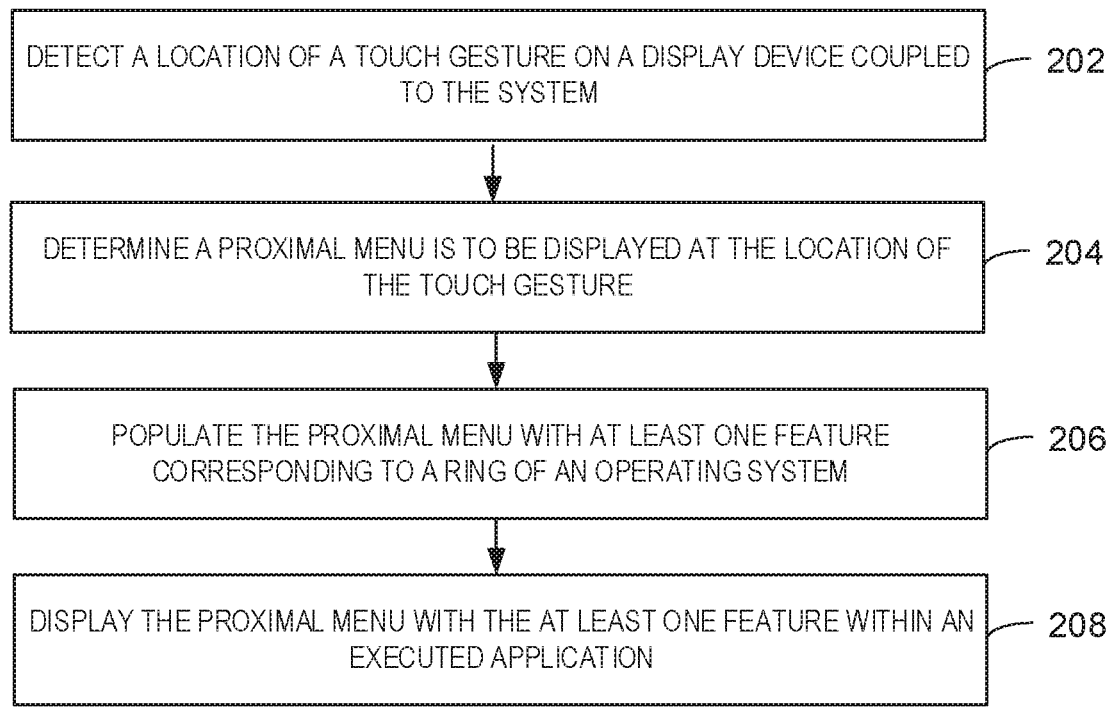
FIG. 2 is a process flow diagram of an example method for generating proximal menus.

FIG. 2 is a process flow diagram of an example method for generating a proximal menu. The method 200 can be implemented with any suitable computing device, such as the computing system 102 of FIG. 1.

At block 202, gesture detector 142, can detect a location of a touch gesture on a display device coupled to the system. In some examples, the touch gesture can include any number of fingers or any other portion of a hand or hands interacting with a display device. For example, the touch gesture can include a one finger touch of the display device, a two finger touch of the display device, or any additional number of fingers touching the display device. In some embodiments, the touch gesture can include two hands contacting a region of a display device. In some examples, the touch gesture can be based on a contact threshold value that indicates a size and shape of a region of the display device in which a touch gesture can be detected. In some examples, the area of the region corresponds to any suitable touch of a display device. For example, a first finger touching the display device can indicate that additional fingers or hands touching the display device can be considered part of the touch gesture within a particular distance from the first finger contact. In some embodiments, the touch gesture can also include a temporal component. For example, the touch gesture may include any number of fingers or hands contacting the display device within a particular region within a particular time frame. In some examples, a delay between touching two fingers to the display device can result in separate touch gestures being detected.

In some embodiments, the display device can extrapolate a touch gesture based on a movement proximate a display device. For example, the gesture detector 142 can use cameras coupled to a system to detect contactless gestures targeting portions of the display device. The gesture detector 142 can extrapolate or determine the location of the display device being selected based on the contactless gesture.

At block 204, a proximal menu manager 144 can determine a proximal menu is to be displayed at the location of the touch gesture. For example, the proximal menu manager 144 can determine if the touch gesture corresponds to a predetermined gesture that invokes generating the proximal menu. As discussed above in relation to block 202, any suitable touch gesture can be linked to the generation of a proximal menu. In some embodiments, the proximal menu manager 144 can detect different touch gestures used to generate proximal menus for different applications. For example, a first application may use a touch gesture with two fingers to generate a proximal menu and a second application may use a touch gesture with three fingers to generate a proximal menu. In some embodiments, the proximal menu manager 144 can detect different proximal menus to be displayed based on the touch gesture. For example, a proximal menu with an application feature may correspond to a two finger touch gesture or a proximal menu with an operating system feature may correspond to a three finger gesture.

At block 206, the proximal menu manager 144 can populate the proximal menu with at least one feature corresponding to a ring of an operating system. As discussed above, the ring of an operating system can include a first ring of an operating system that can correspond to operating system features, a second ring of an operating system that can correspond to application window features, and a third ring of the operating system that can correspond to executed application features, among others. In some examples, the proximal menus can include features corresponding to editing functions of an application, maximizing or minimizing an application window, determining selected applications to be displayed by the operating system, viewing the current executing applications, and the like. The various features corresponding to rings of an operating system are described below in greater detail in relation to FIGS. 3A-3H.

In some examples, a ring of an operating system can indicate a menu feature from the executed application that is accessed a number of times below a threshold value or a menu feature from the executed application that is accessed a number of times above a threshold value. For example, a ring of an operating system may include a cut menu feature from an application if the cut menu feature is accessed a number of times that exceeds a threshold within a time period.

At block 208, a user interface manager 146 can display the proximal menu with the at least one feature within an executed application. In some embodiments, the proximal menu with the at least one feature can be displayed proximate the touch gesture for the executed application. In some embodiments, any number of proximal menus can be displayed for various users interacting with a user interface. In some examples, the proximal menus can be displayed across different applications executed by an operating system or within a single application being executed or by an operating system itself. In some embodiments, the user interface manager 146 can display the proximal menu until a second gesture is detected. For example, a second touch gesture can indicate to close the proximal menu.

In some embodiments, the user interface manager 146 can generate or display a proximal menu based on a plurality of rules corresponding to a layout of the user interface. The plurality of rules can indicate how to display proximal menus within applications being executed. For example, the proximal menus can be generated in relation to other visual elements such as an application launcher, an application switcher, and a window list, among others. An application launcher, as referred to herein, can include a list of executable applications installed on a system, a list of recently accessed applications installed on the system, recommended applications to be installed on the system, and the like. In some examples, the application launcher can include commands that can access programs, documents, and settings. These commands can include a search function based on locally stored applications and files, a list of documents available locally on a device or on a remote server, a control panel to configure components of a device, power function commands to alter the power state of the device, and the like. An application switcher, as referred to herein, can include a link to a digital assistant, a task view illustrating all open applications, a set of icons corresponding to applications being executed, and various icons corresponding to applications and hardware features that are enabled each time a device receives power. In some embodiments, any of the features from the application switcher or application launcher can be included in a proximal menu.

In some embodiments, the plurality of rules can indicate an area of a screen that is to be occupied by the proximal menu. In some examples, proximal menus can be displayed in regions of a display device based on the rules. For example, the location of a proximal menu may depend upon whether application windows are overlapping one another, if more than one application window is visible, and the like. For example, the proximal menu can be placed above, below, left, right, or diagonal of the touch gesture location. In some embodiments, the proximal menu can be displayed proximate a touch gesture location so that the proximal menu is adjacent to a border of the display device or application window, or centered within an application window.

In one embodiment, the process flow diagram of FIG. 2 is intended to indicate that the blocks of the method 200 are to be executed in a particular order. Alternatively, in other embodiments, the blocks of the method 200 can be executed in any suitable order and any suitable number of the blocks of the method 200 can be included. Further, any number of additional blocks may be included within the method 200, depending on the specific application. For example, the method 200 can include populating a proximal menu based on a size of a display device and a location of applications displayed on the display device. In some examples, the method 200 can include populating the proximal menu with application features corresponding to application windows displayed at a distance exceeding a threshold from a recent detected gesture. In some embodiments, the method 200 can include generating a copy of the proximal menu to be displayed at different locations of the display device in response to detecting multiple users providing input. For example, each user interacting with a display device can provide a gesture to a display device to result in a proximal menu being displayed. In some embodiments, the method 200 can include populating a proximal menu with different application features or operating system features depending on the touch gesture. For example, a touch gesture with one finger may correspond to including application features in a proximal menu, a touch gesture with two fingers may correspond to including operating features in the proximal menu, a touch gesture with three fingers may correspond to including tabs for application features and operating system features in the proximal menu, and a touch gesture with four fingers may correspond to including non-custom user interface features in the proximal menu. In some embodiments, any combination of fingers and hands can be used to populate a proximal menu with any combination of application features and operating system features illustrated above in relation to FIGS. 3A-3H below. In some embodiments, the touch gestures can be direct contact of a display device or a movement detected proximate the display device without direct contact. In some embodiments, the method 200 can include reshaping the proximal menu based on a height of a user proximate a display device. For example, one or more cameras coupled to a system can detect facial features of a user proximate a display device. In some examples, the proximal menu can be displayed toward the bottom or the top of a display device based on a height of the user's facial features in relation to a display device. In some embodiments, the method 200 can include reshaping the proximal menu based on an edge of a display device in relation to the proximal menu.

Figure 3A:
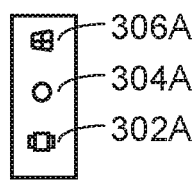
FIGS. 3A-3H are block diagrams of example proximal menus.

FIG. 3A is a block diagram of an example proximal menu with operating system features. In FIG. 3A, the proximal menu 300A can include an operating system feature such as a task view feature 302A, a digital assistant feature 304A and a start menu feature 306A. In some embodiments, the task view feature 302A can provide a representation of each actively executed application on a computing device via one or more display devices. In some embodiments, the digital assistant feature 304A can include any suitable icon enabling a user to provide an audio or text based request for a function. For example, the digital assistant can find and open applications, search for files, open web browsers based on a search query, and the like. In some examples, the start menu feature 306A can include an icon enabling the display of applications installed locally on a computing device, services available via a remote server, and the like.

Figure 3B:
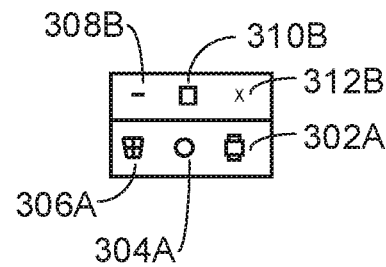

FIG. 3B is a block diagram of an example proximal menu with operating system features and application window features. In FIG. 3B, the proximal menu 300B can include a task view feature 302A, a digital assistant feature 304A, and a start menu feature 306A. Additionally the proximal menu 300B can include a window frame feature such as a minimize feature 308B, a maximize feature 310B, and a close feature 312B corresponding to an application window. The minimize feature 308B can hide a graphical user interface for an actively executed application. In some examples, the graphical user interface of the minimized application can be viewed by selecting an icon corresponding to the application in a task bar of the operating system. The maximize feature 310B can expand the graphical user interface of an application window to fill one or more display devices. In some embodiments, the close feature 312B can terminate the actively executed application.

Figure 3C:
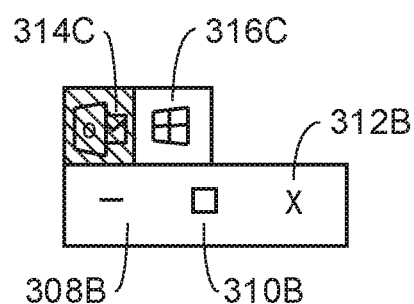

FIG. 3C is a block diagram of an example proximal menu with tabs. For example, the proximal menu can include a first icon corresponding to the executed application and a second icon corresponding to the operating system. In some embodiments, the at least one feature corresponds to the operating system if the second icon is active and the at least one feature corresponds to the executed application if the first icon is active. In FIG. 3C, the proximal menu 300C can include a tab 314C for an application being executed and a tab 316C for an operating system. The tab 314C for the application being executed can include a minimize feature 308B, a maximize feature 310B, and a close feature 312B corresponding to an application window. As discussed below in relation to FIG. 3D, selecting the tab 316C for the operating system can replace the minimize feature 308B, maximize feature 310B, and close feature 312B with operating system features.

Figure 3D:
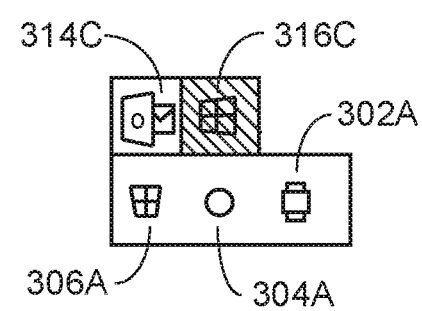

FIG. 3D is a block diagram of an example proximal menu with tabs. In the proximal menu 300D, the operating system tab 316C is selected and a corresponding task view feature 302A, digital assistant feature 304A and start menu feature 306A are displayed. In some examples, any suitable number of tabs can be displayed for executed applications. For example, an unselected tab for an executed application 314C, such as an email application, can be displayed.

Figure 3E:
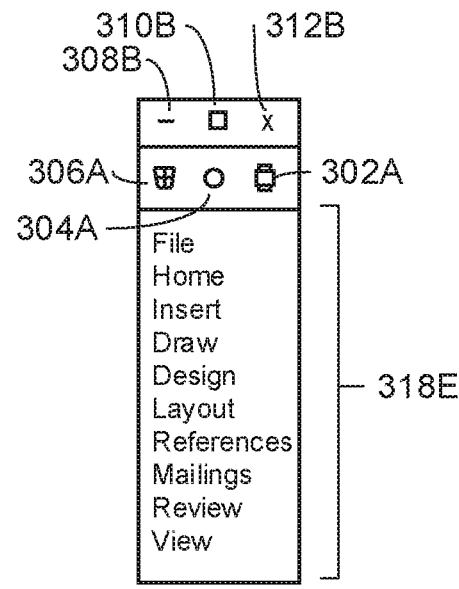

FIG. 3E is a block diagram of a proximal menu including non-custom user interface features for an application and an operating system. The proximal menu 300E can include a minimize feature 308B, a maximize feature 310B, and a close feature 312B corresponding to an application window. The proximal menu 300E can also include a task view feature 302A, digital assistant feature 304A and start menu feature 306A. Furthermore, the proximal menu 300E can include non-custom user interface features 318E for an application. For example, the non-custom user interface features 318E can include a file menu, a home menu, an insert menu, a draw menu, a design menu, a layout menu, a references menu, a mailings menu, a review menu, and a view menu, among others. In some embodiments, the non-custom user interface features 318E are also displayed in menus along the top of an executed application. In some examples, the non-custom user interface features 318E are removed from menus along the top of an executed application so that one instance of the non-custom user interface features 318E are displayed. In some embodiments, the non-custom user interface features 318E are identified based on menu features from the executed application that are accessed a number of times below or above a threshold value.

Figure 3F:
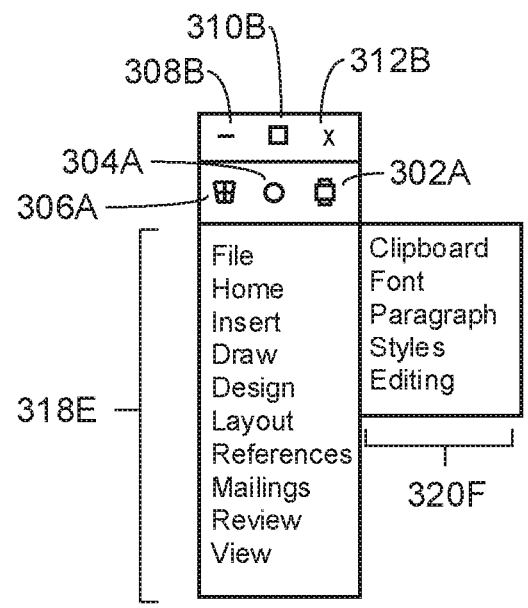

FIG. 3F is a block diagram of a proximal menu including non-custom user interface features for an application and an operating system. The proximal menu 300F can include a minimize feature 308B, a maximize feature 310B, and a close feature 312B corresponding to an application window. The proximal menu 300F can also include a task view feature 302A, digital assistant feature 304A and start menu feature 306A. Furthermore, the proximal menu 300F can include non-custom user interface features 318E for an application. For example, the non-custom user interface features 318E can include a file menu, a home menu, an insert menu, a draw menu, a design menu, a layout menu, a references menu, a mailings menu, a review menu, and a view menu, among others. In some embodiments, the proximal menu 300F can include flyouts 320F for each non-custom user interface feature. For example, the home menu can include a flyout 320F with options such as clipboard, font, paragraph, styles, and editing.

Figure 3G:
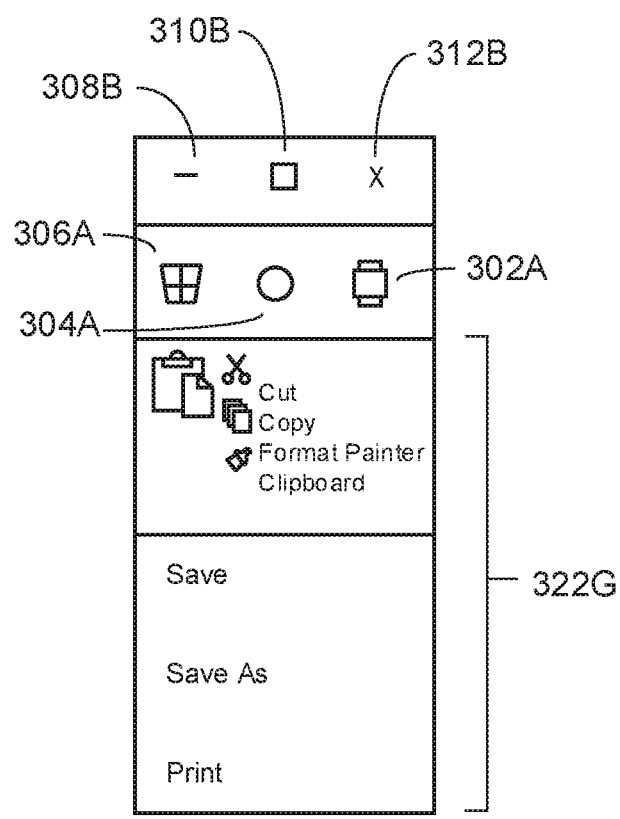

FIG. 3G a block diagram of a proximal menu including custom user interface features for an application and an operating system. The proximal menu 300G can include a minimize feature 308B, a maximize feature 310B, and a close feature 312B corresponding to an application window. The proximal menu 300G can also include a task view feature 302A, digital assistant feature 304A and start menu feature 306A. Furthermore, the proximal menu 300G can include custom user interface features 322G for an application. For example, the custom user interface features 322G can include a paste feature, a cut feature, a copy feature, a format painter feature, a clipboard feature, a save feature, a save as feature, and a print feature. In some examples, the custom user interface features 322G can be copies of non-proximal controls or features located in a menu bar of an application window. As illustrated in FIG. 3G, the custom user interface features 322G can be placed in a proximal placement based on a gesture. In some embodiments, the custom user interface features 322G can be based on user input. For example, user input can indicate any suitable number of custom user interface features 322G to include in the proximal menu 300G. By contrast, the non-custom user interface features 318E of FIG. 3E can be selected by an active application.

Figure 3H:
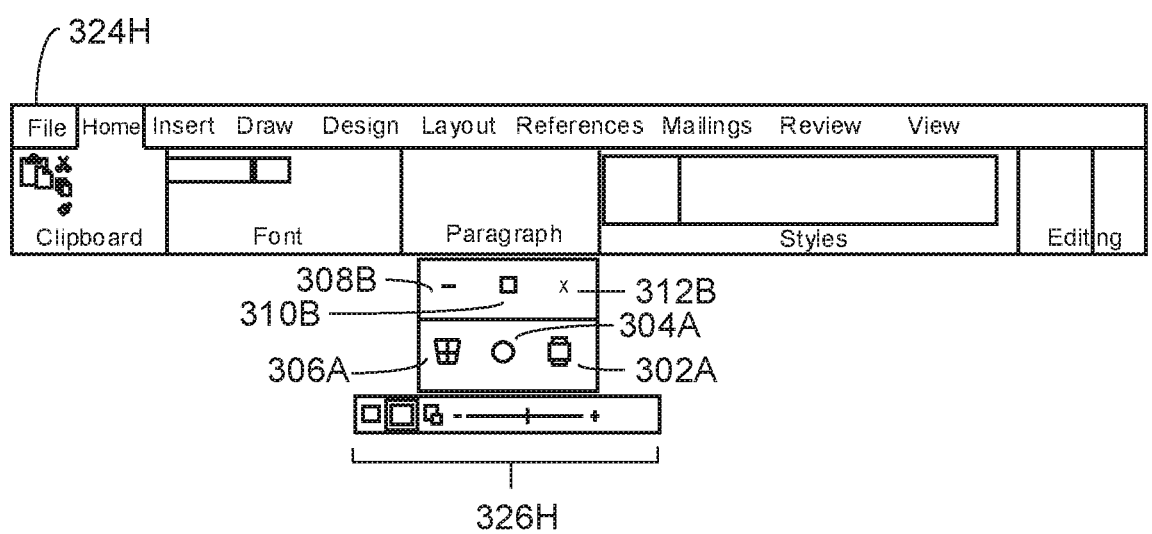

FIG. 3H a block diagram of a proximal menu including user interface features for an application and an operating system. The proximal menu 300H can include a minimize feature 308B, a maximize feature 310B, and a close feature 312B corresponding to an application window. The proximal menu 300H can also include a task view feature 302A, digital assistant feature 304A and start menu feature 306A. In some embodiments, the proximal menu 300H can also include an application command menu 324H. For example, the application command menu 324H for an application being executed can be displayed within or proximate a proximal menu rather than at the top of an application window. The application command menu 324H can be pulled or relocated from the top of an application window, or any other suitable location in an application window, to be included adjacent to or within the proximal menu 300H. As discussed above, the proximal menu 300H can be displayed at a location adjacent to a touch gesture that initiates the proximal menu. In some examples, the application command menu 324H is pulled into a proximal menu 300H temporarily and the application command menu 324H is returned to an original menu of an active application in response to the proximal menu 300H being closed or terminated. In some embodiments, the proximal menu 300H can also include a document feature 326H that can modify the viewing size of an application.

In some embodiments, the proximal menus 300A-300H of FIGS. 3A-3H can be generated based on rules. For example, the rules can indicate a location and size of the proximal menu based on the location of an application window displayed within a display device. In some examples, the rules can be written in an Extensible Application Markup Language (XAML), HTML, and the like, to imperatively or declaratively describe the rules which result in the creation of the proximal menu.

It is to be understood that the block diagrams of FIGS. 3A-3H are not intended to indicate that the proximal menus 300A-300H contain all of the components shown in FIGS. 3A-3H. Rather, the proximal menus 300A-300H can include fewer or additional components not illustrated in FIGS. 3A-3H (e.g., additional application features, additional operating system features, etc.). Furthermore, in some embodiments, a proximal menu may be separately generated for each application being executed by a computing device.

Figure 4:
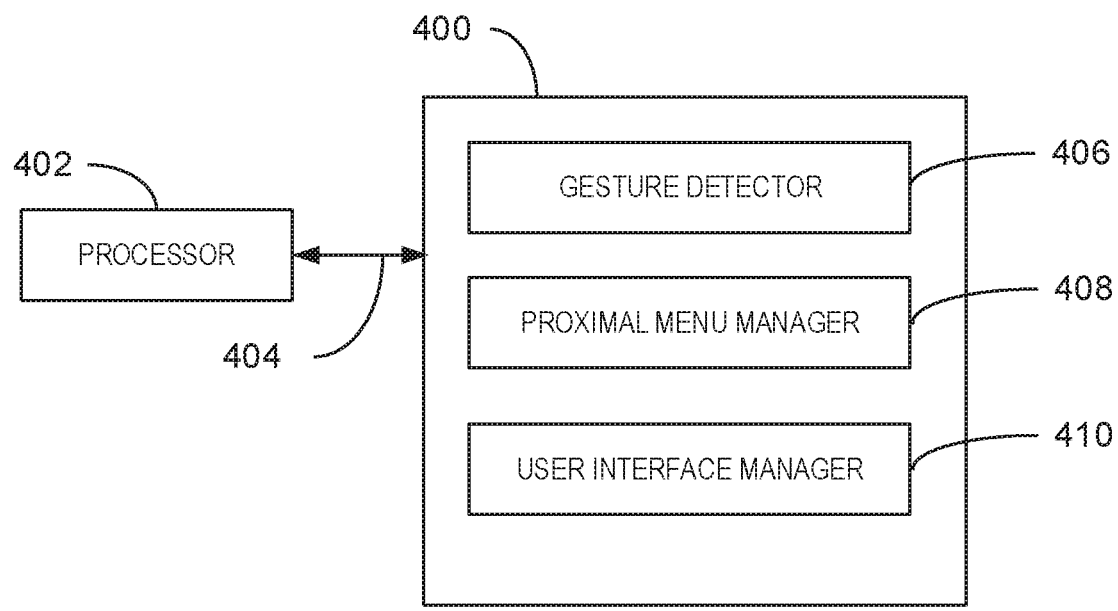
FIG. 4 is a block diagram of an example computer-readable storage media that can generate proximal menus.

FIG. 4 is a block diagram of an example computer-readable storage media that can generate proximal menus. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a gesture detector 406 that can detect a location of a touch gesture on a display device coupled to the system. In some embodiments, a proximal menu manager 408 can determine a proximal menu to be displayed at the location of the touch gesture. Additionally, the proximal menu manager 408 can populate the proximal menu with at least one feature corresponding to a ring of an operating system. Furthermore, a user interface manager 410 can display the proximal menu with the at least one feature within an executed application.

It is to be understood that any number of additional software components not shown in FIG. 4 may be included within the tangible, computer-readable storage media 400, depending on the specific application.

EXAMPLE 1

In one embodiment, a system for generating proximal menus includes a processor and a memory device to store a plurality of instructions that, in response to an execution of the plurality of instructions by the processor, cause the processor to detect a location of a touch gesture on a display device coupled to the system. The plurality of instructions can also cause the processor to determine a proximal menu is to be displayed at the location of the touch gesture and populate the proximal menu with at least one feature corresponding to a ring of an operating system. Furthermore, the plurality of instructions can cause the processor to display the proximal menu with the at least one feature within an executed application.

Alternatively, or in addition, the proximal menu comprises a first icon corresponding to the executed application and a second icon corresponding to the operating system. Alternatively, or in addition, the at least one feature corresponds to the operating system if the second icon is active and the at least one feature corresponds to the executed application if the first icon is active. Alternatively, or in addition, the plurality of instructions cause the processor to reshape the proximal menu based on a height of a user proximate the display device. Alternatively, or in addition, the plurality of instructions cause the processor to reshape the proximal menu based on an edge of the display device in relation to the proximal menu. Alternatively, or in addition, the plurality of instructions cause the processor to display the proximal menu until a second gesture is detected. Alternatively, or in addition, the ring of the operating system comprises an operating system feature. Alternatively, or in addition, the ring of the operating system comprises a window frame feature. Alternatively, or in addition, the ring of the operating system comprises a menu feature from the executed application that is accessed a number of times below a threshold value. Alternatively, or in addition, the ring of the operating system comprises a menu feature from the executed application that is accessed a number of times above a threshold value.

EXAMPLE 2

Another embodiment described herein includes a method for generating proximal menus that includes detecting a location of a touch gesture on a display device coupled to the system and determining a proximal menu is to be displayed at the location of the touch gesture. The method also includes populating the proximal menu with at least one feature corresponding to a ring of an operating system and displaying the proximal menu with the at least one feature within an executed application.

Alternatively, or in addition, the proximal menu comprises a first icon corresponding to the executed application and a second icon corresponding to the operating system. Alternatively, or in addition, the at least one feature corresponds to the operating system if the second icon is active and the at least one feature corresponds to the executed application if the first icon is active. Alternatively, or in addition, the method comprises reshaping the proximal menu based on a height of a user proximate the display device. Alternatively, or in addition, the method comprises reshaping the proximal menu based on an edge of the display device in relation to the proximal menu. Alternatively, or in addition, the method comprises displaying the proximal menu until a second gesture is detected. Alternatively, or in addition, the ring of the operating system comprises an operating system feature. Alternatively, or in addition, the ring of the operating system comprises a window frame feature. Alternatively, or in addition, the ring of the operating system comprises a menu feature from the executed application that is accessed a number of times below a threshold value. Alternatively, or in addition, the ring of the operating system comprises a menu feature from the executed application that is accessed a number of times above a threshold value.

EXAMPLE 3

Another embodiment described herein includes one or more computer-readable storage media for generating proximal menus, wherein the one or more computer-readable storage media comprise a plurality of instructions that, in response to execution by a processor, cause the processor to detect a location of a touch gesture on a display device coupled to the system. The plurality of instructions can also cause the processor to determine a proximal menu is to be displayed at the location of the touch gesture and populate the proximal menu with at least one feature corresponding to a ring of an operating system. Furthermore, the plurality of instructions can cause the processor to display the proximal menu with the at least one feature within an executed application.

Alternatively, or in addition, the proximal menu comprises a first icon corresponding to the executed application and a second icon corresponding to the operating system. Alternatively, or in addition, the at least one feature corresponds to the operating system if the second icon is active and the at least one feature corresponds to the executed application if the first icon is active. Alternatively, or in addition, the plurality of instructions cause the processor to reshape the proximal menu based on a height of a user proximate the display device. Alternatively, or in addition, the plurality of instructions cause the processor to reshape the proximal menu based on an edge of the display device in relation to the proximal menu. Alternatively, or in addition, the plurality of instructions cause the processor to display the proximal menu until a second gesture is detected. Alternatively, or in addition, the ring of the operating system comprises an operating system feature. Alternatively, or in addition, the ring of the operating system comprises a window frame feature. Alternatively, or in addition, the ring of the operating system comprises a menu feature from the executed application that is accessed a number of times below a threshold value. Alternatively, or in addition, the ring of the operating system comprises a menu feature from the executed application that is accessed a number of times above a threshold value.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for generating proximal menus, comprising:
   a processor; and
   a memory device to store a plurality of instructions that, in response to an execution of the plurality of instructions by the processor, cause the processor to:
   detect a location of a first touch gesture on a display device coupled to the system;
   generate a proximal menu to be displayed at the location of the first touch gesture in response to detecting the first touch gesture comprising a number of fingers contacting the display device;
   display a first tab of the proximal menu, the first tab corresponding to an operating system feature;
   in response to detecting a second touch gesture comprising a different number of fingers contacting the display device, replace the first tab with a second tab corresponding to an application window feature of an executed application, wherein the application window feature comprises a command menu of a displayed application window of the executed application that is copied from the displayed application window and pulled into the proximal menu; and
   in response to detecting a third gesture comprising a different number of fingers than the first gesture or the second gesture, replace the second tab with a third tab corresponding to an application window feature of a second executed application.

2. The system of claim 1, wherein the second tab comprises a first icon corresponding to the executed application and the first tab comprises a second icon corresponding to an operating system.

3. The system of claim 2, wherein the application window feature is displayed if the second tab is active and the operating system feature is displayed if the first tab is active.

4. The system of claim 1, wherein the plurality of instructions cause the processor to reshape the proximal menu based on a height of a user proximate the display device.

5. The system of claim 1, wherein the plurality of instructions cause the processor to reshape the proximal menu based on an edge of the display device in relation to the proximal menu.

6. The system of claim 1, wherein the plurality of instructions cause the processor to display the proximal menu until a fourth gesture is detected.

7. The system of claim 1, wherein the application window feature comprises a window frame feature.

8. The system of claim 1, wherein the application window feature comprises a menu feature from the executed application that is accessed a number of times above a threshold value.

9. The system of claim 1, wherein the first touch gesture comprises the number of fingers contacting the display device within a time interval.

10. The system of claim 1, wherein the application window feature command menu comprises an item selected in response to being accessed a number of times that exceeds a threshold.

11. A method for generating proximal menus, comprising:
    detecting a location of a first touch gesture on a display device coupled to a system;
    generating a proximal menu to be displayed at the location of the first touch gesture in response to detecting the first touch gesture comprising a number of fingers contacting the display device;
    display a first tab of the proximal menu, the first tab corresponding to an operating system feature;
    in response to detecting a second touch gesture comprising a different number of fingers contacting the display device, replacing the first tab with a second tab of the proximal menu, the second tab corresponding to an application window feature of an executed application, wherein the application window feature comprises a command menu of a displayed application window of the executed application that is copied from the displayed application window and pulled into the proximal menu; and
    in response to detecting a third gesture comprising a different number of fingers than the first gesture or the second gesture, replacing the second tab with a third tab corresponding to an application window feature of a second executed application.

12. The method of claim 11, wherein the first tab comprises a first icon corresponding to the executed application and the second tab comprises a second icon corresponding to an operating system.

13. The method of claim 12, wherein the application window feature is displayed if the second tab is active and the operating system feature is displayed if the first tab is active.

14. The method of claim 11, comprising reshaping the proximal menu based on a height of a user proximate the display device.

15. The method of claim 11, comprising reshaping the proximal menu based on an edge of the display device in relation to the proximal menu.

16. The method of claim 11, comprising displaying the proximal menu until a fourth gesture is detected.

17. The method of claim 11, wherein the application window feature comprises a window frame feature.

18. The method of claim 11, wherein the application window feature comprises a menu feature from the executed application that is accessed a number of times above a threshold value.

19. One or more computer-readable media storage devices for generating proximal menus, wherein the one or more computer-readable media storage devices comprise a plurality of instructions that, in response to execution by a processor, cause the processor to:

detect a location of a first touch gesture on a display device coupled to a system;

generate a proximal menu to be displayed at the location of the first touch gesture in response to detecting the first touch gesture comprising a number of fingers contacting the display device;

display a first tab of the proximal menu, the first tab corresponding to an operating system feature;

in response to detecting a second touch gesture comprising a different number of fingers contacting the display device, replace the first tab with a second tab of the proximal menu, the second tab corresponding to an application window feature of an executed application, wherein the application window feature comprises a command menu of a displayed application window of the executed application that is copied from the displayed application window and pulled into the proximal menu; and in response to detecting a third gesture comprising a different number of fingers than the first gesture or the second gesture, replace the second tab with a third tab corresponding to an application window feature of a second executed application.

20. The one or more computer-readable media storage devices of claim 19, wherein the proximal menu comprises at least one feature that corresponds to an operating system if the first tab is active and the at least one feature corresponds to the executed application if the second tab is active.

* * * * *